(12) United States Patent
Kawahira et al.

(10) Patent No.: US 10,202,059 B2
(45) Date of Patent: Feb. 12, 2019

(54) LOAD DETECTION SENSOR AND LOAD DETECTION SENSOR UNIT

(71) Applicant: Fujikura Ltd., Tokyo (JP)

(72) Inventors: Tetsuya Kawahira, Tokyo (JP); Shigeru Nakazaki, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/546,358

(22) PCT Filed: Jan. 27, 2016

(86) PCT No.: PCT/JP2016/052388
§ 371 (c)(1),
(2) Date: Jul. 26, 2017

(87) PCT Pub. No.: WO2016/121836
PCT Pub. Date: Aug. 4, 2016

(65) Prior Publication Data
US 2018/0025861 A1    Jan. 25, 2018

(30) Foreign Application Priority Data

Jan. 27, 2015  (JP) .................................. 2015-013670

(51) Int. Cl.
*B60N 2/70*    (2006.01)
*B60N 2/90*    (2018.01)
(Continued)

(52) U.S. Cl.
CPC ............... *B60N 2/90* (2018.02); *B60N 2/002* (2013.01); *B60N 2/7094* (2013.01); *G01L 1/225* (2013.01);
(Continued)

(58) Field of Classification Search
CPC .......... B60N 2/002; B60N 2/646; B60N 2/64; G01G 19/08; G01G 19/4142; G01L 1/142;
(Continued)

(56) References Cited

U.S. PATENT DOCUMENTS 5,896,090 A     4/1999  Okada et al.
5,963,124 A *  10/1999  Buss ..................... H01C 10/34
                                                    338/118
(Continued)

FOREIGN PATENT DOCUMENTS

CN     101006331 A     7/2007
CN     101423035 A     5/2009
(Continued)

OTHER PUBLICATIONS

Office Action dated May 21, 2018, issued in counterpart Chinese Application No. 201680001543.2, with English translation. (9 pages).
(Continued)

*Primary Examiner* — Harshad R Patel
*Assistant Examiner* — Brandi N Hopkins
(74) *Attorney, Agent, or Firm* — Westerman, Hattori, Daniels & Adrian, LLP

(57) ABSTRACT

A load detection sensor 5 of the invention includes: a first electrode sheet 50 which includes first electrode 52 and a first contact point 53; a second electrode sheet 60 which includes a second electrode 62 and a second contact point 63; a spacer 70 which is disposed between the first electrode sheet and the second electrode sheet; one terminal 5A which is electrically connected to the first electrode 52; and the other terminal 5B which is electrically connected to the first contact point 53. A connection maintaining portion AP in which an electrical connection is maintained even when an external pressure is not applied thereto is formed by the first
(Continued)

contact point 53 and the second contact point 63, and odd series of the switches SW electrically connected in series between one terminal 5A and the other terminal 5B are set.

12 Claims, 8 Drawing Sheets

(51) Int. Cl.
*H01H 13/16* (2006.01)
*B60N 2/00* (2006.01)
*G01L 1/22* (2006.01)
*H01H 13/04* (2006.01)
*H01H 13/14* (2006.01)
*H01H 13/703* (2006.01)
*H01H 13/10* (2006.01)
*H01H 13/50* (2006.01)

(52) U.S. Cl.
CPC ............ *H01H 13/04* (2013.01); *H01H 13/10* (2013.01); *H01H 13/14* (2013.01); *H01H 13/16* (2013.01); *H01H 13/50* (2013.01); *H01H 13/703* (2013.01); *H01H 2231/026* (2013.01)

(58) Field of Classification Search
CPC ............... G01L 1/205; B60R 21/01524; B60R 21/01516; H01H 3/141; H01H 13/78; H01H 2201/038; H01H 2205/016; H01H 2225/018; H01H 2203/038; H01H 13/807; H01H 2215/004; H01H 2225/03; H03K 17/9625; H01C 10/10; H04M 1/23
See application file for complete search history.

(56) References Cited

U.S. PATENT DOCUMENTS

| | | | | |
|---|---|---|---|---|
| 8,186,233 B2 * | 5/2012 | Joung | ............... | G01L 1/205 |
| | | | | 73/862.68 |
| 2005/0072249 A1 * | 4/2005 | Maeda | ............... | B60N 2/002 |
| | | | | 73/862.046 |
| 2009/0003008 A1 | 1/2009 | Ohtake et al. | | |
| 2012/0031685 A1 | 2/2012 | Saitoh | | |
| 2014/0246887 A1 * | 9/2014 | Clos | ............... | B60N 2/002 |
| | | | | 297/217.3 |

FOREIGN PATENT DOCUMENTS

| | | | | | |
|---|---|---|---|---|---|
| CN | 203414209 U | | 1/2014 | | |
| EP | 1626423 A1 | | 2/2006 | | |
| EP | 2450229 A2 | | 5/2012 | | |
| JP | 9-315199 A | | 12/1997 | | |
| JP | 2002228516 | * | 8/2002 | ............ | G01G 19/12 |
| JP | 2006-153608 A | | 6/2006 | | |
| JP | 2012-51548 A | | 3/2012 | | |
| JP | 2012121363 | * | 6/2012 | ............ | G01L 1/20 |
| JP | 2013-16285 A | | 1/2013 | | |
| WO | 2012/053619 A1 | | 4/2012 | | |
| WO | 2013/030009 A1 | | 3/2013 | | |
| WO | 2013/178486 A1 | | 12/2013 | | |

OTHER PUBLICATIONS

International Search Report dated Mar. 22, 2016, issued in counterpart application No. PCT/JP2016/052388. (1 page).

Extended (supplementary) European Search Report dated Sep. 6, 2018, issued in counterpart European Application No. 16743439.8. (9 pages).

* cited by examiner

LOAD DETECTION SENSOR AND LOAD DETECTION SENSOR UNIT

TECHNICAL FIELD

The present invention relates to a load detection sensor and a load detection sensor unit provided inside a vehicle seat, below the vehicle seat, or between the vehicle seat and a cover covering the vehicle seat.

BACKGROUND ART

As one of safety systems in vehicles, an alarm system which indicates a seat belt non-wearing state when a person gets on the vehicle has been practically used. In this alarm system, a warning is generated when the wearing of the seat belt is not detected in a state where the seating of a person is detected. As a load detection sensor used in such an alarm system or the like, a load detection sensor is proposed by Patent Literature 1 as below.

The load detection sensor of Patent Literature 1 includes a plurality of electrodes which are provided at one side to be separated from one another while being fixed to a film surface of a first film and being electrically connected to one another by one line, a plurality of electrodes which are provided at the other side to be separated from one another while being fixed to a film surface facing the first film surface in a second film and being electrically connected to one another by one line, and a spacer which is disposed between the first film and the second film so that the electrodes face each other at a gap therebetween.

[Patent Literature 1] JP-A-9-315199

SUMMARY OF INVENTION

However, in the load detection sensor of Patent Literature 1, there is a case in which a plurality of switches each including one electrode and the other electrode are provided and these switches are connected in series to one another. In such a case, there is a need to set a configuration in which one of a pair of terminals of the load detection sensor is disposed on the first film and the other thereof is disposed on the second film.

Thus, in the load detection sensor of Patent Literature 1, for example, when resistors are connected in parallel to the switches, the resistors need to be provided outside the first film and the second film. For this reason, there is a tendency of increasing in a size, for example, that the number of components for providing the resistors increases.

Here, an object of the invention is to provide a load detection sensor capable of disposing a pair of terminals on any one of a pair of sheets.

To solve the problem, a load detection sensor of the present invention includes: a first electrode sheet which includes at least one first electrode and a first contact point; a second electrode sheet which includes a second electrode facing the first electrode and a second contact point facing the first contact point and electrically connected to the second electrode; a spacer which is disposed between the first electrode sheet and the second electrode sheet and includes at least an opening formed between the first electrode and the second electrode and between the first contact point and the second contact point; one terminal which is electrically connected to the first electrode; and the other terminal which is electrically connected to the first contact point, wherein a switch is formed by the first electrode and the second electrode and a connection maintaining portion in which an electrical connection is maintained even when an external pressure is not applied thereto is formed by the first contact point and the second contact point, and wherein odd series of the switches electrically connected in series between the one terminal and the other terminal are set.

In such a load detection sensor, the circuit portion formed on the first electrode sheet and the circuit portion formed on the second electrode sheet are electrically connected to each other in a normal state through the first contact point of the first electrode sheet and the second contact point of the second electrode sheet. For this reason, in the load detection sensor, the pair of terminals of the circuit can be disposed on the first electrode sheet as long as odd series of the switches connected in series to the circuit of the load detection sensor are set. In this way, the load detection sensor capable of disposing the pair of terminals on the first electrode sheet is provided.

Furthermore, it is preferable that a portion including the second contact point in the second electrode sheet is formed as a leaf spring pressing the second contact point against the first contact point.

In such a case, since the connection state between the first contact point and the second contact point can be maintained even when other members are not provided, a connection error can be prevented.

Furthermore, it is preferable that the second electrode sheet is formed as a metal sheet.

In such a case, since the second electrode sheet is formed of metal and is less influenced by a heat, the sensitivity of the load detection sensor is stabilized even when the load detection sensor is used in a high-temperature environment or a low-temperature environment. Further, since a breakage or the like can be reduced due to the feature of metal, durability can be improved.

Further, it is desirable to further include the pressing member that presses the first electrode sheet and the second electrode sheet so that the contact state between the first contact point and the second contact point is maintained.

In such a case, it is possible to increase a force in which the second contact point presses the first contact point. Thus, it is possible to suppress a non-contact state between the first contact point and the second contact point due to a deviation of a portion in which the second contact point presses the first contact point caused by, for example, the vibration of the vehicle seat or the like.

Furthermore, it is preferable that a coating member that covers at least the first contact point of the first electrode sheet and the second contact point of the second electrode sheet to fix a contact state between the first contact point and the second contact point is further included.

In such a case, it is possible to suppress a non-contact state between the first contact point and the second contact point due to a deviation of a portion in which the second contact point presses the first contact point caused by, for example, the vibration of the vehicle seat or the like.

Furthermore, it is preferable that the first electrode sheet includes a first sheet penetration hole which is formed from one surface facing the second electrode sheet to the other surface opposite to the one surface to penetrate the surfaces, and the first electrode is electrically connected to a circuit portion disposed on the other surface through a first conductive member provided inside the first sheet penetration hole.

In such a case, since one terminal can be drawn to the other surface of the first electrode sheet, a configuration is simplified in the connection to other electronic components. Further, since the circuit portion can be provided on the other surface, the circuit portion does not need to be provided on one surface and thus an unevenness caused by the circuit portion of one surface can be reduced. Accordingly, the sensitivity of the load detection sensor can be stabilized.

Furthermore, it is preferable that an opening at the one surface side of the first sheet penetration hole is located in an area where the first electrode is disposed in the one surface, and the first sheet penetration hole includes an air hole which communicates with an opening between the first electrode and the second electrode through an electrode penetration hole provided in the first electrode.

In such a case, the sheet penetration hole serves as the connection hole electrically connecting the first electrode disposed on one surface of the first electrode sheet to the circuit portion of the other surface of the first electrode sheet and also serves as the exhaust hole discharging air of the spacer to the outside. For this reason, the durability of the first electrode sheet can be improved compared to a case in which the connection hole and the exhaust hole are separately provided. Further, since the exhaust hole does not need to be provided separately, a space can be saved.

Furthermore, it is preferable that the first electrode sheet includes a second sheet penetration hole which is provided at a position different from the first sheet penetration hole and is formed from the one surface facing the second electrode sheet to the other surface opposite to the one surface to penetrate the surfaces, and the first contact point is electrically connected to a circuit portion disposed on the other surface through a second conductive member provided inside the second sheet penetration hole.

In such a case, since the pair of terminals can be drawn to the other surface of the first electrode sheet, a configuration is simplified in the connection to other electronic components. Further, since the circuit portion can be provided on the other surface, the circuit portion does not need to be provided on one surface and thus an unevenness caused by the circuit portion of one surface can be reduced. Accordingly, the sensitivity of the load detection sensor can be stabilized.

Furthermore, it is preferable that a resistor which is disposed on the other surface and electrically connects the first electrode and the first contact point to each other is included.

In such a case, it is possible to prevent a problem in which the sensitivity of the load detection sensor becomes poor due to a thickness even when the resistor is thick.

Furthermore, it is preferable that a printed resistor which is disposed on the one surface and electrically connects the first electrode and the first contact point to each other is included.

In such a case, a decrease in thickness can be realized compared to a case in which the chip resistor is disposed. Further, since the printed resistor is accommodated inside while being covered by the first insulation sheet and the spacer, an influence such as static electricity is reduced compared to a case in which the resistor is disposed on an outer surface of the first insulation sheet.

Furthermore, the present invention may also be a load detection sensor unit including: the load detection sensor according to any of the above; and a switch pressing portion which is disposed on the switch and presses the switch when an external pressure is applied thereto.

Furthermore, the load detection sensor unit may also include a housing which includes an accommodation space for accommodating the load detection sensor and a housing cover which covers the accommodation space, and the switch pressing portion may also be provided in the housing cover.

In such a load detection sensor unit, since the switch pressing portion disposed on the switch of the load detection sensor presses the switch, an appropriate load can be transmitted to the load detection sensor through the switch pressing portion.

As described above, according to the invention, the load detection sensor and the load detection sensor unit capable of disposing the pair of terminals on any one of the pair of sheets are realized.

DESCRIPTION OF EMBODIMENTS (1) First Embodiment

Figure 1:
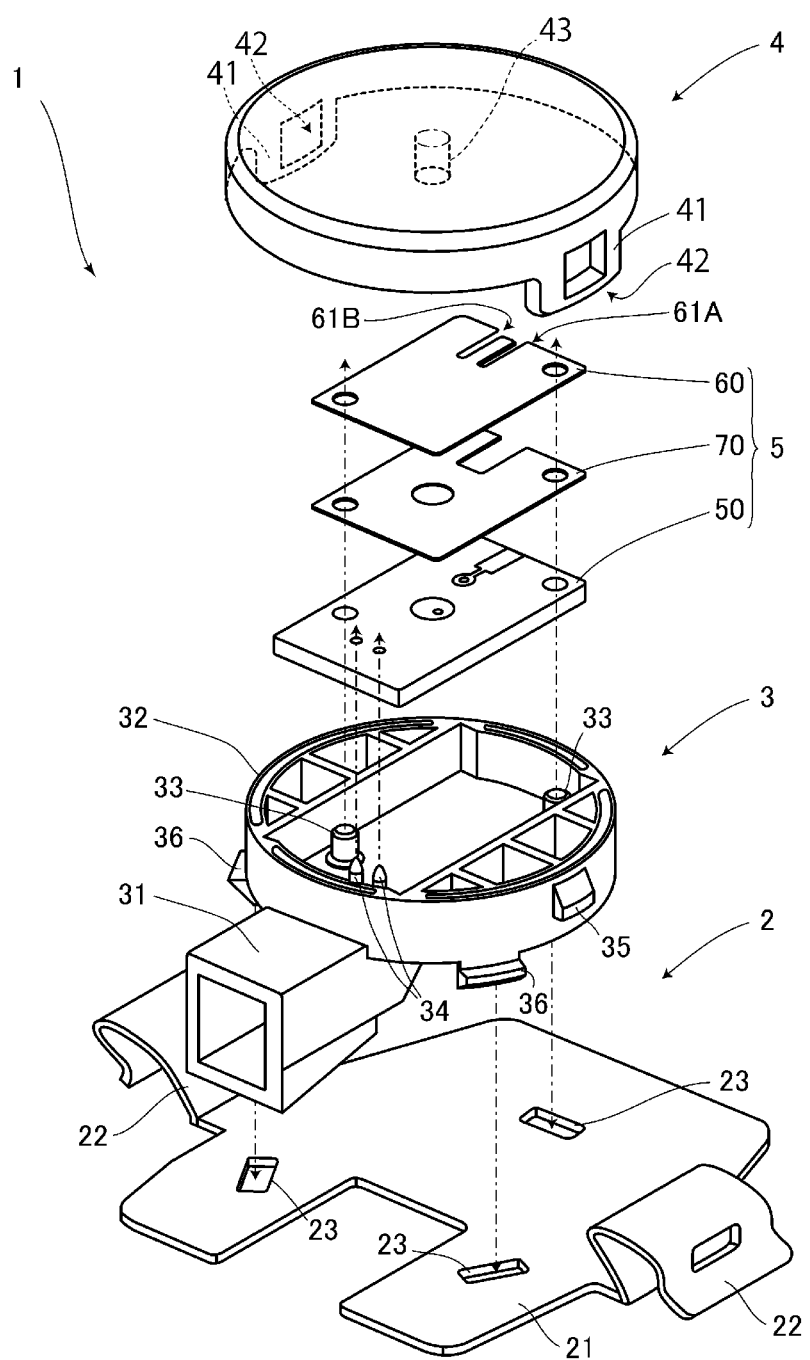
FIG. 1 is an exploded view illustrating a configuration of a load detection sensor unit.

A first embodiment of the invention will be described in detail with reference to the drawings. FIG. 1 is an exploded view illustrating a configuration of a load detection sensor unit. As illustrated in FIG. 1, a load detection sensor unit 1 mainly includes a pedestal 2, a housing 3, a housing cover 4, and a load detection sensor 5.

The pedestal 2 includes a placement portion 21 on which a housing 3 is placed and a pair of hook portions 22 which is connected to the placement portion 21. The placement portion 21 is provided with a plurality of penetration holes 23 which are formed from a placement surface used to place the housing 3 thereon to a surface opposite to the placement surface to penetrate the surfaces.

The pair of hook portions 22 faces each other with the placement portion 21 interposed therebetween and is fitted into two adjacent spring portions among a plurality of springs stretched across an opening of a vehicle frame. When the pair of hook portions 22 is fitted into two adjacent spring portions, the placement portion 21 is disposed between two springs below a vehicle seat placed on the plurality of springs.

The housing 3 includes a connector portion 31 which is connected to a vehicle control unit and a switch accommodation portion 32 which is connected to the connector portion 31. The switch accommodation portion 32 includes a bottom wall and a frame wall and an accommodation space accommodating the load detection sensor 5 is formed by a bottom wall and a frame wall.

A fixing pin 33 and a connection pin 34 are provided in the bottom wall of the switch accommodation portion 32. The fixing pin 33 is a pin for fixing the load detection sensor 5 accommodated inside the housing 3. The connection pin 34 is electrically connected to a connector terminal of the connector portion 31. Further, the connection pin 34 is inserted into a first electrode sheet 50 located below the load detection sensor 5 among a spacer 70, a second electrode sheet 60, and the first electrode sheet 50 constituting the load detection sensor 5 and is electrically connected to the load detection sensor 5. Additionally, in FIG. 1, the connector terminal of the connector portion 31 is omitted for convenience of description.

A protrusion piece 35 is provided in an outer surface of the frame wall of the switch accommodation portion 32 and a hook piece 36 fitted into the penetration hole 23 of the pedestal 2 is provided at a lower end of the frame wall. When the hook piece 36 is fitted into the penetration hole 23 of the pedestal 2, the housing 3 is fixed to the pedestal 2.

The housing cover 4 is a lid member that covers an accommodation space of the switch accommodation portion 32 and includes a top wall and a frame wall. A pair of arms 41 is provided at the lower end of the frame wall of the housing cover 4 and an opening 42 is formed in the arm 41 by punching so that the protrusion piece 35 of the switch accommodation portion 32 of the housing 3 is fitted thereinto. When the protrusion piece 35 of the housing 3 is fitted into the openings 42 of the pair of arms 41, the housing cover 4 is fixed to the housing 3.

The top wall of the housing cover 4 is provided with a switch pressing portion 43 which protrudes from an inner surface facing the bottom wall of the switch accommodation portion 32 of the housing 3. The switch pressing portion 43 is disposed to be separated from a switch portion of the load detection sensor 5 with a gap interposed therebetween when the housing cover 4 is fixed to the housing 3.

An outer surface of the top wall of the housing cover 4 is formed as a surface facing a lower surface of the vehicle seat. That is, the pedestal 2 is disposed between two springs below the vehicle seat placed on a plurality of springs. Then, when the housing cover 4 is attached to the housing 3 fixed to the pedestal 2, the housing cover 4 is located to be separated from the lower surface of the vehicle seat with a gap interposed therebetween. When a person sits on the vehicle seat in this case, the vehicle seat drops down and the housing cover 4 is pressed so that the switch portion of the load detection sensor 5 is pressed by the switch pressing portion 43 of the housing cover 4. Additionally, as a material of the housing cover 4, resin such as polycarbonate (PC), polyamide (PA), polybutylene terephthalate (PBT), phenol resin, and epoxy resin or glass fiber containing the resin can be exemplified.

Figure 2:
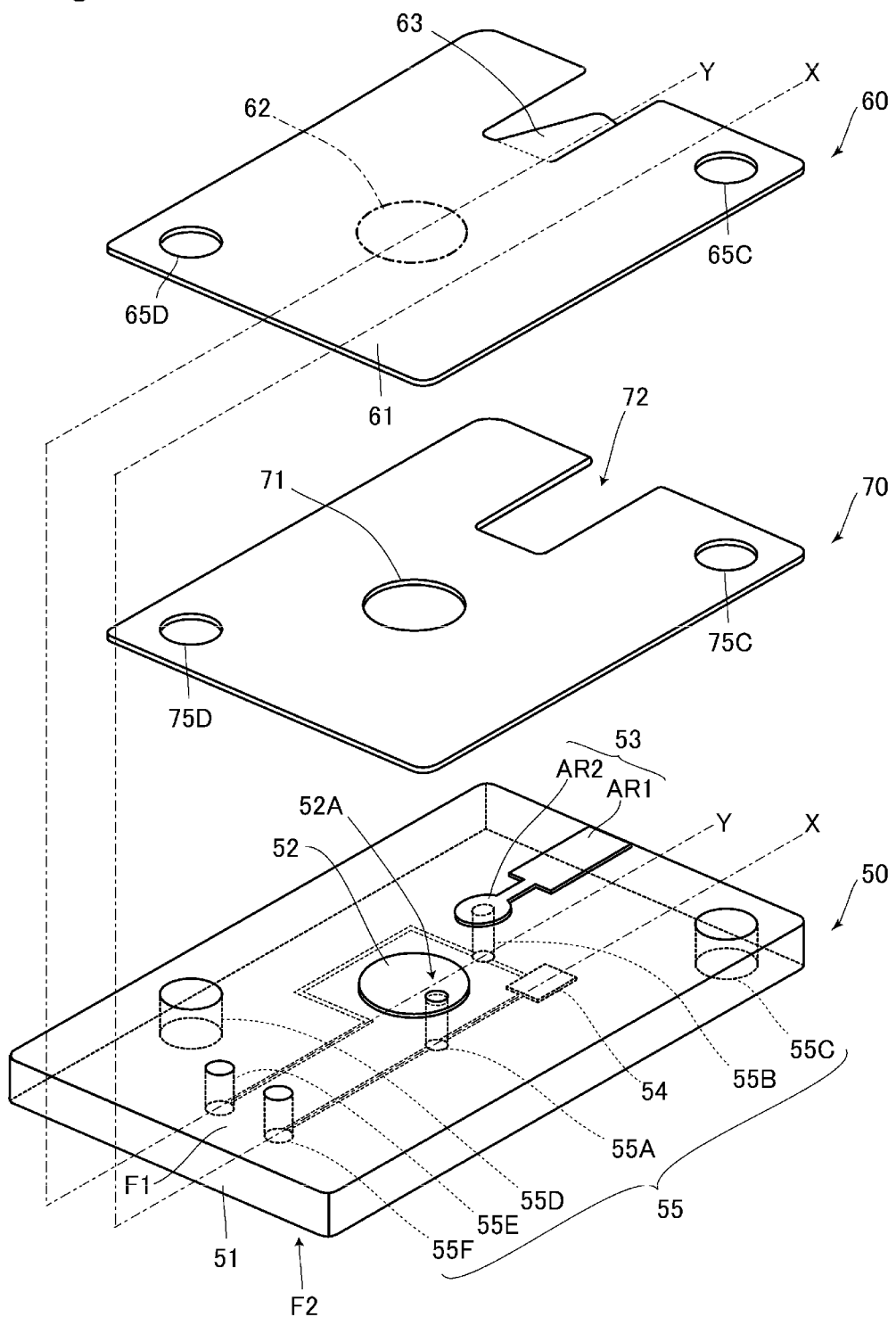
FIG. 2 is an exploded view illustrating a configuration of a load detection sensor.
Figure 3A:
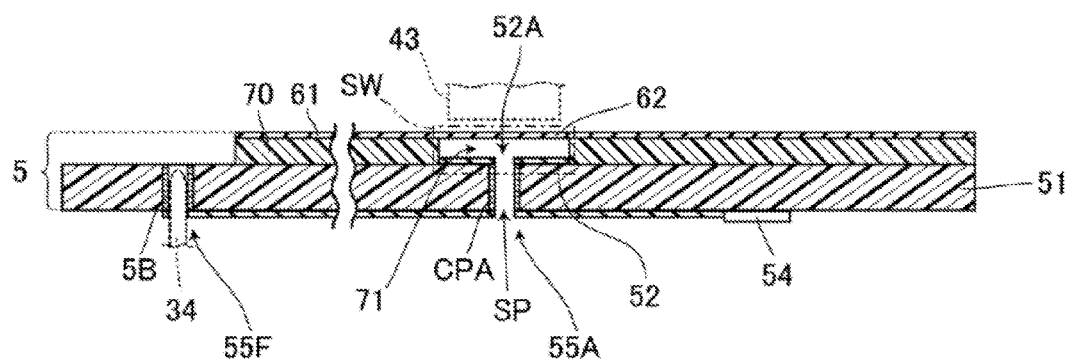
FIG. 3A and FIG. 3B are diagrams illustrating a cross-section of the load detection sensor.
Figure 3B:
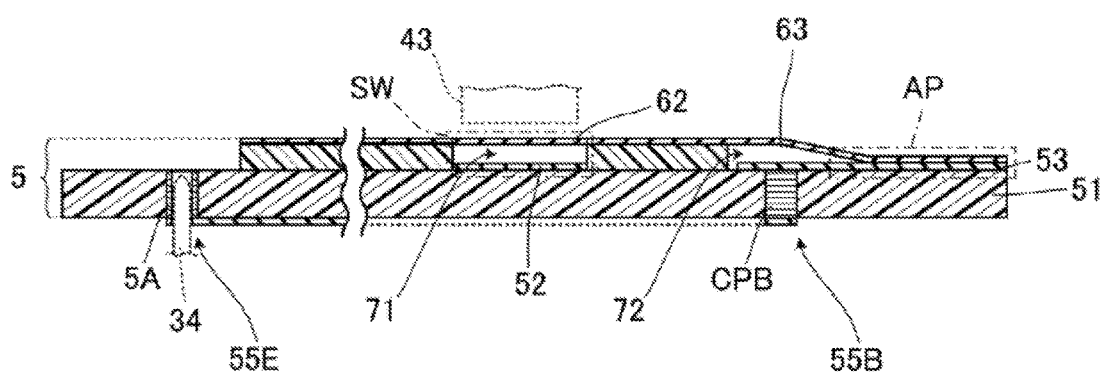

FIG. 2 is an exploded view illustrating a configuration of the load detection sensor and FIG. 3 is a diagram illustrating a cross-section of the load detection sensor. Specifically, (A) of FIG. 3 is a diagram illustrating a cross-section taken along a line X-X of FIG. 2 and (B) of FIG. 3 is a diagram illustrating a cross-section taken along a line Y-Y of FIG. 2.

As illustrated in FIGS. 2 and 3, the first electrode sheet 50 of the load detection sensor 5 includes, for example, an insulation substrate 51 without flexibility. As a material of the substrate 51, phenol resin or epoxy resin can be exemplified. A first electrode 52 and a first contact point 53 are disposed on one surface F1 facing the second electrode sheet 60 in the substrate 51.

The first electrode 52 is one switch element constituting the switch SW and is formed as, for example, a circular metal printed layer. Additionally, the other switch element constituting the switch SW is a second electrode 62 provided on the second electrode sheet 60.

The first contact point 53 is one member that forms a connection maintaining portion AP ((B) of FIG. 3) of which an electrical connection is maintained even when an external pressure is not applied to the load detection sensor unit 1 and is formed as, for example, a metal printed layer. The first contact point 53 of the embodiment includes a contact area AR1 contacting a second contact point 63 of the second electrode sheet 60 which is the other member forming the connection maintaining portion AP and a non-contact area AR2 not contacting the second contact point 63 and electrically connected to the contact area AR1. Additionally, an external pressure is a pressing force which is applied from the vehicle seat to the load detection sensor unit 1 in response to the seating of the person.

The other surface F2 opposite to one surface F1 in the substrate 51 is formed as a lower surface of the load detection sensor 5 and a resistor 54 is disposed on the other surface F2. The resistor 54 is a resistor for detecting a short-circuit and is connected in parallel to the switch SW including the first electrode 52 and the second electrode 62. In the case of the embodiment, the resistor 54 is formed as a chip resistor.

The substrate 51 is provided with a sheet penetration hole 55 which is formed from one surface F1 to the other surface F2 of the substrate 51 to penetrate the surfaces. The sheet penetration hole 55 includes a first sheet penetration hole 55A, a second sheet penetration hole 55B, fixing penetration holes 55C and 55D, and pin penetration holes 55E and 55F.

The first sheet penetration hole 55A is a sheet penetration hole in which an opening is located within an area where the first electrode 52 is disposed in one surface F1 of the substrate 51. A first conductive member CPA is provided inside the first sheet penetration hole 55A and the first electrode 52 is electrically connected to a circuit portion disposed on the other surface F2 of the substrate 51 through the first conductive member CPA.

The first conductive member CPA is provided along an inner peripheral surface of the first sheet penetration hole 55A and an air hole SP surrounded by the first conductive member CPA communicates with an opening 71 of the spacer 70 through an electrode penetration hole 52A provided in the first electrode 52. That is, the first sheet penetration hole 55A includes the air hole SP which communicates with the opening 71 between the first electrode 52 and the second electrode 62 through the electrode penetration hole 52A penetrating the first electrode 52.

In this way, the first sheet penetration hole 55A serves as a hole which connects the first electrode 52 disposed on one surface F1 of the substrate 51 to the circuit portion disposed on the other surface F2 and also serves as an exhaust hole discharging air inside the opening 71 of the spacer 70 to the outside of the load detection sensor 5.

The second sheet penetration hole 55B is a sheet penetration hole in which an opening is located within an area where the first contact point 53 is disposed in one surface F1 of the substrate 51. In the embodiment, the opening of the second sheet penetration hole 55B is located inside the non-contact area AR2 of the first contact point 53.

A second conductive member CPB is charged into the second sheet penetration hole 55B and the first contact point 53 is electrically connected to the circuit portion disposed on the other surface F2 of the substrate 51 through the second conductive member CPB. Additionally, since the second conductive member CPB is charged into the second sheet penetration hole 55B, there is no space corresponding to the air hole SP of the first sheet penetration hole 55A.

The fixing penetration holes 55C and 55D (FIG. 2) are penetration holes through which the fixing pins 33 provided in the bottom wall of the switch accommodation portion of the housing 3 are inserted. The diameters of the fixing penetration holes 55C and 55D are substantially the same as the outer diameter of the fixing pin 33.

The pin penetration holes 55E and 55F are penetration holes through which the connection pins 34 provided in the housing 3 are inserted. A terminal 5A which is one terminal portion of the electric circuit of the load detection sensor 5 is provided inside the pin penetration hole 55E and a terminal 5B which is the other terminal portion of the electric circuit of the load detection sensor 5 is provided inside the pin penetration hole 55F. The terminals 5A and 5B are provided along inner peripheral surfaces of the corresponding pin penetration holes 55E and 55F and a width of a space surrounded by the terminals 5A and 5B is set to be substantially the same as the outer diameter of the connection pin 34.

The second electrode sheet 60 includes a metal sheet 61, the second electrode 62, and the second contact point 63.

The metal sheet 61 is a thin metal sheet having flexibility and in the embodiment is formed in a thin cuboid shape having a vertical width shorter than a vertical width of the substrate 51 and having a horizontal width equal to a horizontal width of the substrate 51. The material of the metal sheet 61 is not particularly limited as long as metal is used and, for example, stainless steel or copper can be exemplified.

The metal sheet 61 is provided with fixing penetration holes 65C and 65D which are formed from one surface to the other surface of the metal sheet 61 to penetrate the surfaces. The fixing penetration holes 65C and 65D are penetration holes through which the fixing pins 33 provided in the bottom wall of the switch accommodation portion of the housing 3 are inserted and are formed to have the same shape and size as those of the fixing penetration holes 55C and 55D formed in the substrate 51 of the first electrode sheet 50.

The second electrode 62 is the other switch element constituting the switch SW and in the embodiment is formed as a portion facing the first electrode 52 through the spacer 70 in the metal sheet 61. That is, a part of the metal sheet 61 serves as the second electrode 62. Additionally, for example, a metal layer formed of a material which is the same as or different from the metal sheet 61 may be disposed as the second electrode 62 on a portion facing the first electrode 52 through the spacer 70 in the metal sheet 61.

The second contact point 63 is one member constituting the connection maintaining portion AP and in the embodiment is formed as a leaf spring.

That is, the metal sheet 61 is provided with a pair of notches 61A and 61B (FIG. 1) which extends from one end to the other end of the metal sheet 61 and is disposed with a predetermined gap interposed therebetween and a portion interposed between the notch 61A and 61B (FIG. 1) is formed as the second contact point 63. Further, the second contact point 63 is formed as a leaf spring when a base of the second contact point 63 is bent to face the spacer 70 so that the second contact point 63 is inclined with respect to the sheet surface of the metal sheet 61. In this way, a portion different from a portion formed as the second electrode 62 in the metal sheet 61 serves as the second contact point 63. Additionally, a shape of the leaf spring formed as the second contact point 63 may be, for example, a trapezoidal shape in which a width of a base is larger than a width of an opening end or various shapes other than a rectangle and a trapezoid are applicable.

Additionally, the arrangement portions of the second electrode 62 and the second contact point 63 with respect to the fixing penetration holes 65C and 65D of the second electrode sheet 60 and the arrangement portions of the first electrode 52 and the first contact point 53 with respect to the fixing penetration holes 55C and 55D in the first electrode sheet 50 have the same relative positional relation.

The spacer 70 is a thin insulation member interposed between the first electrode sheet 50 and the second electrode sheet 60 and in the embodiment is formed to have the same shape and size as those of the metal sheet 61. As a material of the spacer 70, a resin such as PET, PI (polyimide), or PEN can be exemplified.

An opening 71 is formed in the spacer 70. The opening 71 is formed at a position overlapping the first electrode 52 and the second electrode 62 in the vertical direction between the first electrode 52 disposed on the substrate 51 and the second electrode 62 of the metal sheet 61 facing the first electrode 52. The size of the opening 71 is set to be slightly smaller than the size of the first electrode 52.

Further, the spacer 70 is provided with a slit-shaped opening 72. The opening 72 is formed at a position overlapping the first contact point 53 and the second contact point 63 in the vertical direction between the first contact point 53 disposed on the substrate 51 and the second contact point 63 of the metal sheet 61 facing the first contact point 53. The size of the opening 72 is set to be slightly larger than the size of the leaf spring formed as the second contact point 63 in the metal sheet 61.

Further, the spacer 70 is provided with fixing penetration holes 75C and 75D which are formed from one surface to the other surface of the spacer 70 to penetrate the surfaces. The fixing penetration holes 75C and 75D are penetration holes through which the fixing pins 33 provided in the bottom wall of the switch accommodation portion of the housing 3 are inserted and are formed to have the same shape and size as those of the fixing penetration holes 55C and 55D formed in the substrate 51 of the first electrode sheet 50.

Further, the arrangement portions of the opening 71 and the opening 72 with respect to the fixing penetration holes 75C and 75D of the spacer 70 and the arrangement portions of the first electrode 52 and the first contact point 53 with respect to the fixing penetration holes 55C and 55D of the first electrode sheet 50 have the same relative positional relation.

The first electrode sheet 50, the second electrode sheet 60, and the spacer 70 overlap one another to form the load detection sensor 5. In the embodiment, as illustrated in FIG. 1, the pin penetration holes 55E and 55F of the first electrode sheet 50 communicate with the pair of connection pins 34 of the housing 3. Accordingly, the terminals 5A and 5B provided inside the pin penetration holes 55E and 55F contact the corresponding connection pins 34 and are electrically connected to the connector terminal of the connector portion 31 of the housing 3 through the connection pin 34. Further, the fixing penetration holes 75C and 75D of the spacer 70 and the fixing penetration holes 65C and 65D of the second electrode sheet 60 sequentially communicate with the fixing pin 33 of the housing 3. Then, the first electrode sheet 50, the spacer 70, and the second electrode sheet 60 are fixed to the fixing pin 33 while one surface F1 of the substrate 51 contacts one surface of the spacer 70 and one surface of the metal sheet 61 contacts the other surface of the spacer 70.

Additionally, the second contact point 63 which forms the connection maintaining portion AP ((B) of FIG. 3) in the load detection sensor 5 is plastically deformed to be normally inclined with respect to the sheet surface of the metal sheet 61. For this reason, when the first electrode sheet 50 and the second electrode sheet 60 overlap each other with the spacer 70 interposed therebetween, the second contact point 63 continuously presses the first contact point 53 facing the second contact point 63 through the opening 72. Thus, in the connection maintaining portion AP, the electrical connection state between the first contact point 53 and the second contact point 63 is maintained even when an external pressure is not applied to the load detection sensor unit 1.

Incidentally, the load detection sensor 5 which is obtained by overlapping the first electrode sheet 50, the second electrode sheet 60, and the spacer 70 is pressed from the second electrode sheet 60 by the switch pressing portion 43 (FIG. 1) of the housing cover 4 when a person sits on the vehicle seat. In this case, in the load detection sensor 5, the metal sheet 61 of the second electrode sheet 60 is bent to enter the opening 71 of the spacer 70 so that the first electrode 52 and the second electrode 62 facing each other with the opening 71 interposed therebetween contact each other. As a result, the switch SW of the load detection sensor 5 is turned on and the circuit of the load detection sensor 5 is electrically connected. In this way, since the switch pressing portion 43 disposed on the switch SW of the load detection sensor 5 presses the switch SW, an appropriate load can be transmitted to the load detection sensor 5 through the switch pressing portion 43.

Additionally, the first sheet penetration hole 55A communicates with the opening 71 of the spacer 70 through the electrode penetration hole 52A of the first electrode 52 as described above ((A) of FIG. 3). For this reason, air of the opening 71 is discharged to the outside of the load detection sensor 5 while not staying inside the opening when the metal sheet 61 of the second electrode sheet 60 is bent. Thus, it is possible to prevent a problem in which the bending of the metal sheet 61 of the second electrode sheet 60 is suppressed by the air inside the opening 71. Accordingly, since the first electrode 52 and the second electrode 62 easily contact each other, the sensitivity of the load detection sensor 5 is improved.

Figure 4:
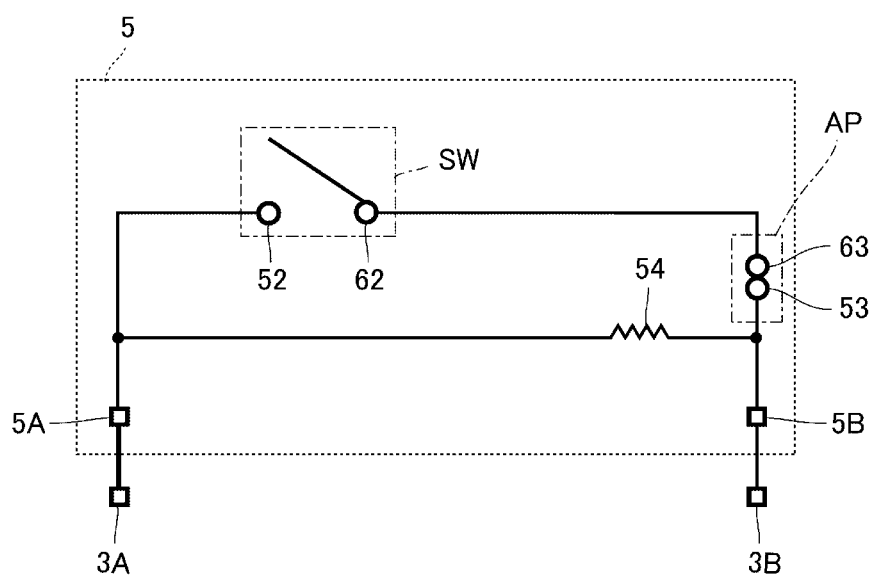
FIG. 4 is a diagram illustrating an equivalent circuit of the load detection sensor.

FIG. 4 is a diagram illustrating an equivalent circuit of the load detection sensor 5. As illustrated in FIG. 4, the switch SW (the first electrode 52 and the second electrode 62) and the connection maintaining portion AP (the first contact point 53 and the second contact point 63) are provided between the pair of terminals 5A and 5B which corresponds to circuit terminals of the load detection sensor 5.

The switch SW is electrically connected in series between the pair of terminals 5A and 5B and is connected to the connector terminals 3A and 3B provided in the connector portion 31 of the housing 3 through the pair of terminals 5A and 5B. Further, the resistor 54 is electrically connected in parallel to the switch SW.

As described above, the load detection sensor unit 1 of the embodiment includes the first electrode sheet 50, the second electrode sheet 60, and the spacer 70 disposed between the first electrode sheet 50 and the second electrode sheet 60. The first electrode sheet 50 includes one first electrode 52 and the first contact point 53 and the second electrode sheet 60 includes the second electrode 62 which faces the first electrode 52 and the second contact point 63 which faces the first contact point 53 and is electrically connected to the second electrode 62. The spacer 70 includes at least the openings 71 and 72 which are provided between the first electrode 52 and the second electrode 62 and between the first contact point 53 and the second contact point 63.

Further, the switch SW includes the first electrode 52 and the second electrode 62 and the connection maintaining portion AP which maintains an electrical connection even when an external pressure is not applied thereto is formed by the first contact point 53 and the second contact point 63. Then, one series of switches SW electrically connected in series between one terminal 5A and the other terminal 5B in the load detection sensor 5 is set.

In such a load detection sensor unit 1, the circuit portion formed on the first electrode sheet 50 and the circuit portion formed on the second electrode sheet 60 are normally electrically connected to each other through the first contact point 53 of the first electrode sheet 50 and the second contact point 63 of the second electrode sheet 60. For this reason, the pair of terminals 5A and 5B can be respectively disposed on the first electrode sheet 50. In this way, the load detection sensor unit 1 in which the pair of terminals can be disposed on the first electrode sheet 50 is provided.

In the case of the embodiment, a portion including the second contact point 63 in the second electrode sheet 60 is formed as a leaf spring pressing the second contact point 63 against the first contact point 53.

Thus, since the connection state between the first contact point 53 and the second contact point 63 can be maintained even when other members are not provided, a connection error can be prevented. Further, since there is no need to provide other members pressing the second contact point 63 against the first contact point 53 when the first contact point 53 and the second contact point 63 are connected to each other only by the leaf spring, the number of components can be decreased and a decrease in size can be realized.

In the case of the embodiment, the second electrode sheet 60 is formed as the metal sheet 61. For this reason, since there is a small influence caused by the heat in the second electrode sheet 60, the sensitivity of the load detection sensor 5 is stabilized even in a high-temperature environment or a low-temperature environment. Further, since the second electrode sheet 60 is formed of metal, a breakage or the like can be reduced and thus durability can be improved. In addition, since the second contact point 63 formed as a leaf spring in the second electrode sheet 60 is also formed of metal, it is possible to increase the malleability and ductility of the second contact point 63 formed as the leaf spring compared to a case in which a part of the resinous sheet is formed as the leaf spring. Thus, it is possible to improve the durability of the leaf spring by reducing a breakage such as bending of the second contact point 63 formed as the leaf spring.

Further, in the case of the embodiment, the substrate 51 which becomes a sheet of the first electrode sheet 50 includes the first sheet penetration hole 55A which is formed from one surface F1 facing the second electrode sheet 60 to the other surface F2 to penetrate the surfaces. Further, the first electrode 52 is electrically connected to the circuit portion disposed on the other surface F2 of the substrate 51 through the first conductive member CPA provided inside the first sheet penetration hole 55A.

For this reason, one terminal 5A can be drawn to the other surface F2 of the substrate 51. As in the embodiment, the terminal 5A can be disposed inside the pin penetration hole 55E different from the first sheet penetration hole 55A. Thus, a simple configuration is obtained when the load detection sensor unit 1 is connected to other electronic components such as the connector portion 31. Further, since the circuit portion can be provided on the other surface F2, the circuit portion does not need to be provided on one surface F1 and thus an unevenness caused by the circuit portion of one surface F1 can be reduced. Accordingly, the sensitivity of the load detection sensor 5 can be stabilized.

Further, in the case of the embodiment, the opening at one surface side of the first sheet penetration hole 55A is located at an area where the first electrode 52 is disposed in one surface F1 of the substrate 51. Further, the first sheet penetration hole 55A includes the air hole SP which communicates with the opening 71 between the first electrode 52 and the second electrode 62 through the electrode penetration hole 52A provided in the first electrode 52.

For this reason, the first sheet penetration hole 55A serves as a connection hole which electrically connects the first electrode 52 disposed on one surface F1 of the substrate 51 to the circuit portion of the other surface of the substrate 51 and also serves as an exhaust hole which discharges air of the spacer to the outside. For this reason, it is possible to improve the durability of the substrate 51 compared to a case in which the connection hole and the exhaust hole are separately provided. Further, since there is no need to provide a separate exhaust hole, a space can be saved.

Further, in the case of the embodiment, the substrate 51 which becomes a sheet of the first electrode sheet 50 includes the second sheet penetration hole 55B which is provided at a position different from the first sheet penetration hole 55A and is formed from one surface F1 facing the second electrode sheet 60 to the other surface F2 to penetrate the surfaces. Further, the first contact point 53 is electrically connected to the circuit portion disposed on the other surface F2 of the substrate 51 through the second conductive member CPB provided inside the second sheet penetration hole 55B.

For this reason, the pair of terminals 5A and 5B can be drawn to the other surface F2 of the substrate 51. As in the embodiment, the terminals 5A and 5B can be disposed inside the pin penetration holes 55E and 55F different from the first sheet penetration hole 55A. Thus, a configuration is simplified when the load detection sensor unit 1 is connected to other electronic components such as the connector portion 31. Further, since the circuit portion can be provided on the other surface F2, the circuit portion does not need to be provided on one surface F1 and thus an unevenness caused by the circuit portion of one surface F1 can be reduced. Accordingly, the sensitivity of the load detection sensor 5 can be stabilized.

Further, in the case of the embodiment, the resistor 54 which is disposed on the other surface F2 of the substrate 51 and connects the first electrode 52 and the first contact point 53 to each other is provided. For this reason, it is possible to prevent a problem in which the sensitivity of the load detection sensor unit 1 becomes poor due to a thickness even when the resistor 54 is thick.

Additionally, in the embodiment, the circuit portion and the resistor 54 of the second electrode sheet 60 are provided on the other surface F2 of the substrate 51 and the pair of terminals 5A and 5B is provided inside the pin penetration holes 55E and 55F. For this reason, since components other than the first electrode 52 and the first contact point 53 substantially do not exist on one surface F1 of the substrate 51, an unevenness caused by other components disappears and thus the sensitivity of the load detection sensor unit 1 is further improved.

(2) Second Embodiment

Next, a second embodiment of the invention will be described in detail with reference to the drawings. Here, the same reference numerals will be given to the components which are the same as or equivalent to those of the first embodiment among the components of the load detection sensor unit of the second embodiment and a repetitive description thereof will be appropriately omitted.

Figure 5:
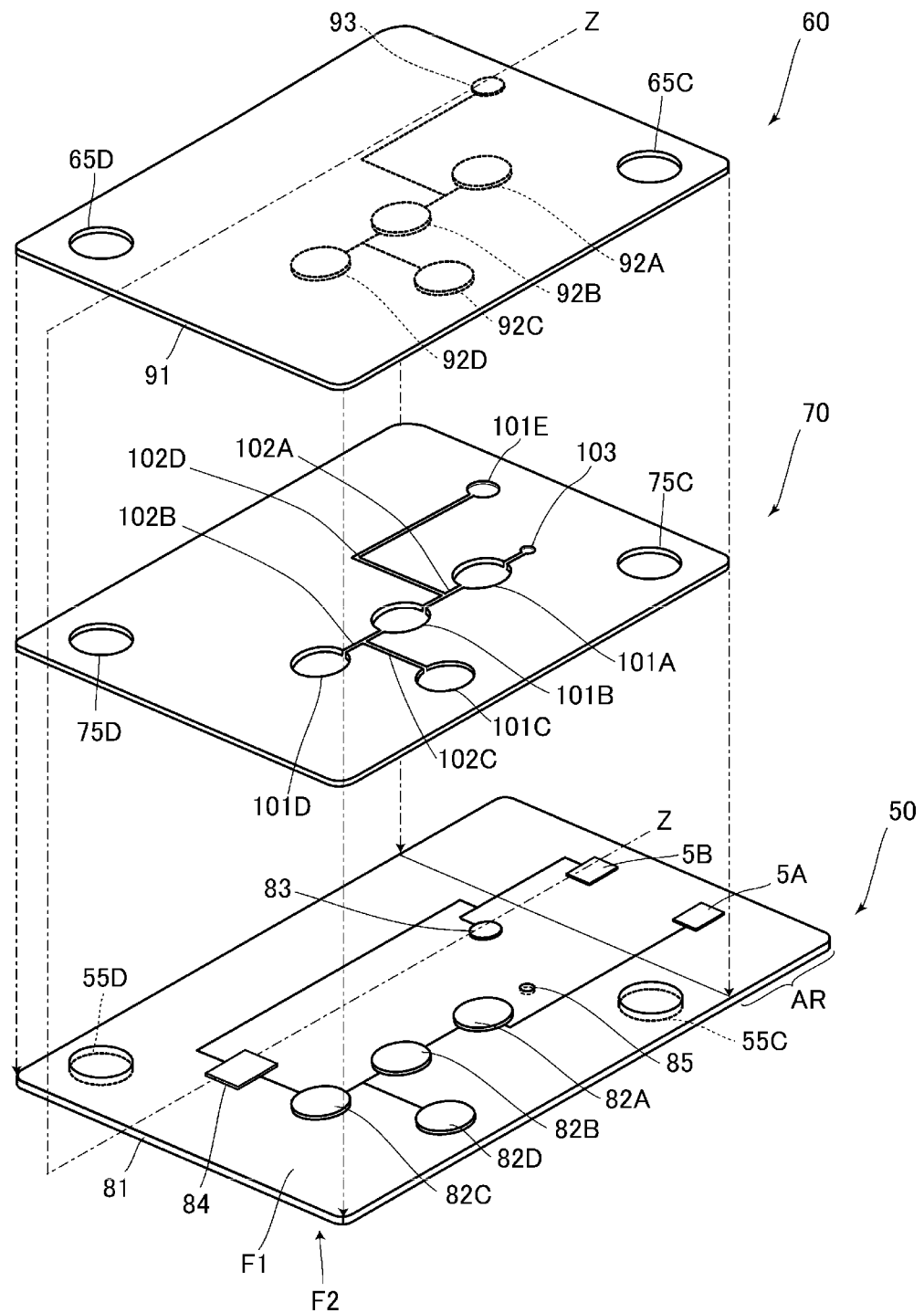
FIG. 5 is an exploded view illustrating a configuration of a load detection sensor of a second embodiment.
Figure 6:
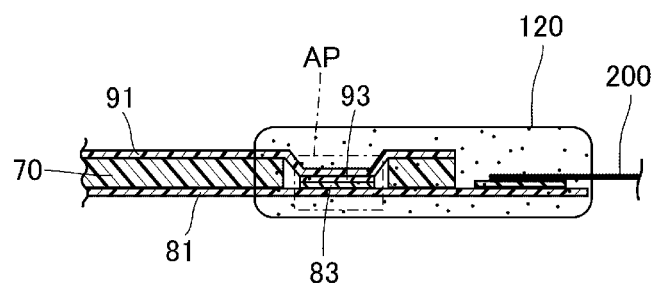
FIG. 6 is a diagram illustrating a cross-section taken along a line Z-Z of FIG. 5.
Figure 7:
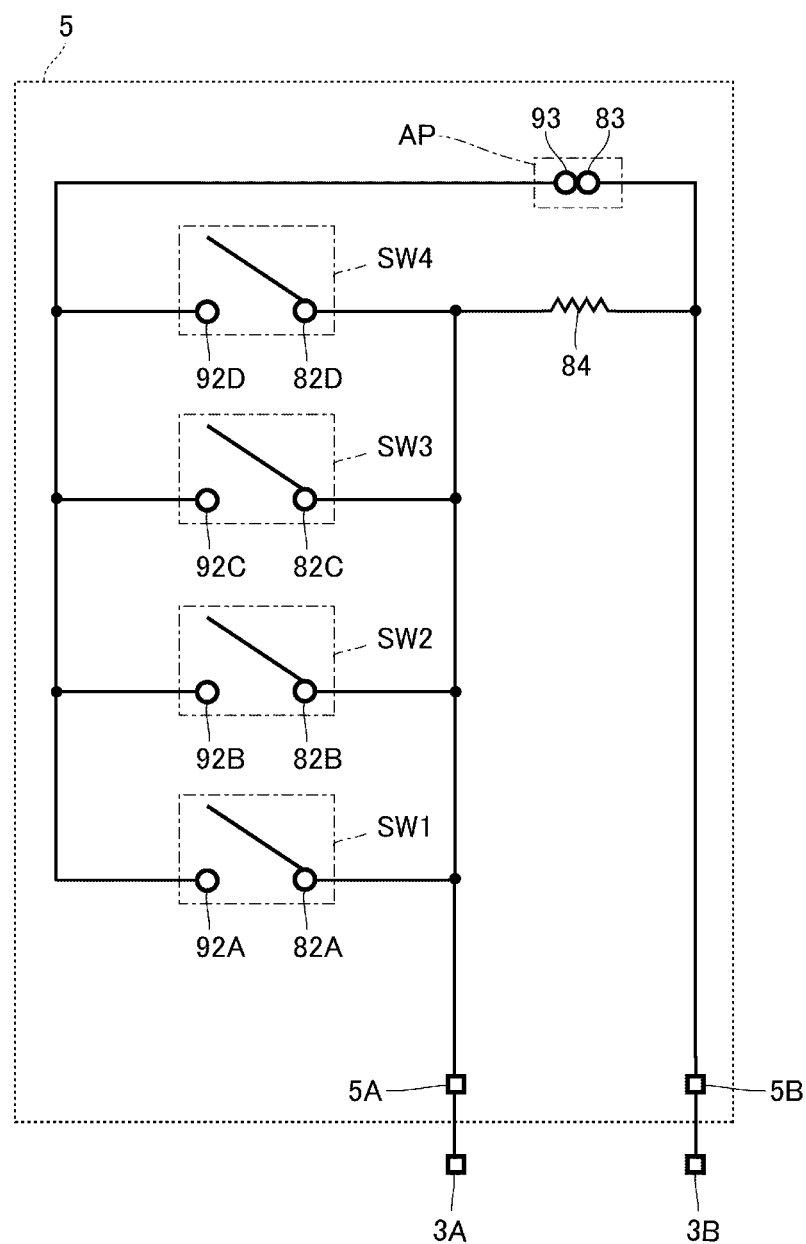
FIG. 7 is a diagram illustrating an equivalent circuit of the load detection sensor of the second embodiment.

FIG. 5 is an exploded view illustrating a configuration of the load detection sensor of the second embodiment. FIG. 6 is a diagram illustrating a cross-section taken along a line Z-Z of FIG. 5. FIG. 7 is a diagram illustrating an equivalent circuit of the load detection sensor of the second embodiment.

In the first embodiment, as illustrated in FIG. 4, the number of the switches SW of the load detection sensor 5 is one and the number of series of the switches SW electrically connected in series between the pair of terminals 5A and 5B of the load detection sensor 5 is one.

On the contrary, in the embodiment, as illustrated in FIG. 7, the number of the switches of the load detection sensor 5 is four. Since switches SW1 to SW4 are connected in parallel to one another, the switches SW1 to SW4 are respectively electrically connected in series between the pair of terminals 5A and 5B of the load detection sensor 5. That is, in the embodiment, a plurality of switches are provided in the load detection sensor 5, but one series of the switches electrically connected in series between the pair of terminals 5A and 5B of the load detection sensor 5 is set.

Additionally, one switch elements constituting the switches SW1 to SW4 are first electrodes 82A to 82D and the other switch elements constituting the switches SW1 to SW4 are second electrodes 92A to 92D.

Further, in the first embodiment, as illustrated in FIGS. 1 and 3, the top wall of the housing cover 4 is provided with one switch pressing portion 43 located above the switch SW of the load detection sensor 5 and separated from the second electrode sheet 60 of the load detection sensor 5 with a gap interposed therebetween.

On the contrary, in the embodiment, instead of the switch pressing portion 43, the top wall of the housing cover 4 is provided with four switch pressing portions (not illustrated) respectively located above the switches SW1 to SW4 of the load detection sensor 5 and separated from the second electrode sheet 60 of the load detection sensor 5 with a gap interposed therebetween.

Further, in the first embodiment, as illustrated in FIG. 2, the insulation substrate 51 without flexibility is provided as the sheet of the first electrode sheet 50 and the metal sheet 61 is provided as the sheet of the second electrode sheet 60. Then, partially different portions of the metal sheet 61 are formed as the second electrode 62 and the second contact point 63.

On the contrary, in the embodiment, as illustrated in FIG. 5, a first insulation sheet 81 with flexibility is used as the sheet of the first electrode sheet 50 and a second insulation sheet 91 with flexibility is used as the sheet of the second electrode sheet 60. As materials of the first insulation sheet 81 and the second insulation sheet 91, a resin such as PET, PI, or PEN can be exemplified.

The second electrodes 92A to 92D which are formed as, for example, metal printed layers are respectively provided in portions facing the first electrodes 82A to 82D through the spacer 70 in the second insulation sheet 91. Further, a second contact point 93 which is provided as, for example, a metal printed layer is provided in a portion facing the first contact point 83 through the spacer 70 in the second insulation sheet 91. The second contact point 93 and the first contact point 83 have the substantially same shape and size.

Further, in the first embodiment, as illustrated in (B) of FIG. 3, the second contact point 63 provided in a portion including an edge of the metal sheet 61 is formed as a leaf spring. The second contact point 63 of the leaf spring continuously presses the first contact point 53 and thus an electrical connection state between the first contact point 53 and the second contact point 63 is maintained even when an external pressure is not applied to the load detection sensor unit 1.

On the contrary, in the embodiment, as illustrated in FIG. 6, a coating member 120 covering at least the first contact point 83 and the second contact point 93 to fix a contact state between the first contact point 83 and the second contact point 93 is provided. The coating member 120 is formed by, for example, molding and the first contact point 83 and the second contact point 93 which physically come into contact with each other are fixed by the coating member 120. For this reason, the connection between the first contact point 83 and the second contact point 93 is further strongly maintained compared to a case of the first embodiment using the pressing of only the leaf spring. Thus, it is possible to prevent a non-connection state between the first contact point 83 and the second contact point 93 due to a deviation of a portion in which the second contact point 93 presses the first contact point 83 caused by, for example, the vibration of the vehicle seat or the like. Additionally, in FIG. 5, the coating member 120 is omitted for convenience of description.

Further, in the first embodiment, as illustrated in FIG. 3, the pin penetration holes 55E and 55F are provided in the substrate 51 and the terminals 5A and 5B are provided along the inner peripheral surfaces of the pin penetration holes 55E and 55F. These terminals 5A and 5B are connected to the connector terminals 3A and 3B through the connection pin 34 inserted into the pin penetration holes 55E and 55F.

On the contrary, in the embodiment, as illustrated in FIG. 5, the pin penetration holes 55E and 55F are not provided and the terminals 5A and 5B are provided in an area AR which is not covered by the spacer 70 in one surface F1 of the first insulation sheet 81. As illustrated in FIG. 6, one end of a lead wire 200 is connected to the terminals 5A and 5B and the terminals 5A and 5B are electrically connected to the connector terminals 3A and 3B connected to the other end of the lead wire 200 through the lead wire 200.

Additionally, in the embodiment, a portion in which one end of the lead wire 200 is connected to the terminals 5A and 5B is coated with the coating member 120 along with the first contact point 83 and the second contact point 93. For this reason, a connection between the first contact point 83 and the second contact point 93 and a connection between one end of the lead wire 200 and the terminals 5A and 5B are further strongly maintained by the coating member 120. In addition, it is possible to suppress a mixture of an external static electricity. Further, since the first sheet penetration hole 55A, the second sheet penetration hole 55B, and the pin penetration holes 55E and 55F are omitted, the durability of the first insulation sheet 81 is improved to a degree in which the penetration holes are omitted.

Further, in the first embodiment, as illustrated in FIG. 2, since the first sheet penetration hole 55A communicates with the opening 71 of the spacer 70 through the electrode penetration hole 52A of the first electrode 52, the first sheet penetration hole 55A serves as an electric connection hole and an exhaust hole.

On the contrary, in the embodiment, as illustrated in FIG. 5, the first electrodes 82A to 82D are not provided with the electrode penetration hole 52A. Further, the first insulation sheet 81 is provided with the exhaust penetration hole 85 separately from the first sheet penetration hole 55A and openings 101A to 101E of the spacer 70 communicate with the first insulation sheet 81.

That is, in the spacer 70 of the embodiment, openings 101A to 101D are respectively formed at positions overlapping the first electrodes 82A to 82D and the second electrodes 92A to 92D in the vertical direction between the first electrodes 82A to 82D and the second electrodes 92A to 92D facing the first electrodes 82A to 82D. Further, an opening 101E is formed at a position overlapping the first contact point 83 and the second contact point 93 in the vertical direction between the first contact point 83 and the second contact point 93. The opening 101E is an opening which brings the first contact point 83 into physical contact with the second contact point 93 and is closed by the first contact point 83 and the second contact point 93 when the first electrode sheet 50 and the second electrode sheet 60 overlap each other with the spacer 70 interposed therebetween. Additionally, the opening 101E corresponds to the slit-shaped opening 72 of the first embodiment.

Further, the spacer 70 is provided with communication slits 102A to 102D allowing the openings 101A to 101E to communicate with one another. The communication slit 102A is used for the communication between the openings 101A and 101B which are connected in series to each other and correspond to the adjacent switches SW1 and SW2. The communication slit 102B is used for the communication between the openings 101B and 101C which are connected in series to each other and correspond to the adjacent switches SW2 and SW3. The communication slit 102C is used for the communication between the communication slit 102B and the opening 101D corresponding to the switch SW4. The communication slit 102D is used for the communication between the communication slit 102A and the opening 101E formed between the first contact point 83 and the second contact point 93. For example, the opening 101A of the openings 101A to 101E is provided with the exhaust slit 103 connected to the exhaust penetration hole 85 of the first insulation sheet 81.

Further, in the first embodiment, as illustrated in FIGS. 3 and 4, the resistor 54 which is formed as a chip resistor is disposed on the other surface F2 of the substrate 51 and the resistor 54 is connected in parallel to the switch SW.

On the contrary, in the embodiment, as illustrated in FIG. 6, a resistor 84 which is formed as a printed resistor is disposed on one surface F1 of the first insulation sheet 81 and the resistor 84 is connected in parallel to the switches SW1 to SW4. Thus, in the embodiment, a decrease in thickness of the load detection sensor 5 is realized compared to the first embodiment. Further, since the resistor 84 is covered by the first insulation sheet 81 and the spacer 70 and is accommodated inside the load detection sensor 5, an influence such as static electricity is reduced compared to the resistor 54 of the first embodiment disposed on an outer surface of the load detection sensor 5.

In such a load detection sensor of the embodiment, the first contact point 83 and the second contact point 93 are electrically connected to each other even when an external pressure is not applied thereto similarly to the first embodiment. Further, in the load detection sensor of the embodiment, one or odd series of the switches electrically connected in series between the pair of terminals 5A and 5B are set.

For this reason, the circuit portion formed on the first insulation sheet 81 and the circuit portion formed on the second insulation sheet 91 are electrically connected to each other in a normal state through the first contact point 83 of the first insulation sheet 81 and the second contact point 93 of the second insulation sheet 91. Thus, each of the pair of terminals 5A and 5B can be disposed on the first insulation sheet 81 similarly to the first embodiment.

(3) Other Embodiments

As described above, the first embodiment and the second embodiment have been described as examples. However, the invention is not limited to the above-described embodiments.

For example, in the above-described embodiments, the number of series of the switches electrically connected in series between the pair of terminals 5A and 5B is one. However, the number of series may not be one as long as the number of series is odd. Similarly to the above-described embodiments, the terminals 5A and 5B which are a pair of terminals of the circuit of the load detection sensor can be disposed on the first electrode sheet 50 as long as the number of series is odd. Additionally, when two or more switches are connected in parallel to the circuit of the load detection sensor 5 as described above, the switches of the switch group in the parallel connection are connected in series between the pair of terminals 5A and 5B. Thus, the number of series of the switches electrically connected in series between the pair of terminals 5A and 5B becomes one even when a plurality of switches are provided in the switch group.

Further, in the above-described first embodiment, the metal sheet 61 is used as a sheet of the second electrode sheet 60. However, a resinous sheet formed of PET, PI, or PEN may be used instead of the metal sheet 61. Additionally, since the resinous sheet cannot be used as a circuit connecting the second electrode 62, the second contact point 93 and the second electrode 62, and the second contact point 93, for example, a circuit such as a metal printed layer connecting the second electrode 62, the second contact point 93 and the second electrode 62, and the second contact point 93 is provided on one surface of the resinous sheet. Even in this configuration, the same effect as that of the first embodiment is obtained. Here, since there is a tendency that the malleability and ductility of the resinous sheet decrease compared to the metal sheet 61 as described above, the metal sheet 61 is desirable from the viewpoint that durability is improved by the prevention of a breakage such as bending of the second contact point 63 formed as the leaf spring.

Further, in the above-described first embodiment, the pair of terminals 5A and 5B is provided inside the pin penetration holes 55E and 55F, but the pair of terminals 5A and 5B may be provided on one surface F1 or the other surface F2 of the substrate 51.

Further, in the above-described second embodiment, the first insulation sheet 81 is used as the sheet of the first electrode sheet 50 and the second insulation sheet 91 is used as the sheet of the second electrode sheet 60. However, the second insulation sheet 91 may be the metal sheet. In this case, since the metal sheet serves as the second electrodes 92A to 92D and the second contact point 93 similarly to the case of the metal sheet 61 of the first embodiment, the number of components can be decreased.

Further, in the above-described second embodiment, the second contact point 93 is not formed as the leaf spring, but the second contact point 93 may be formed as the leaf spring similarly to the first embodiment.

Figure 8:
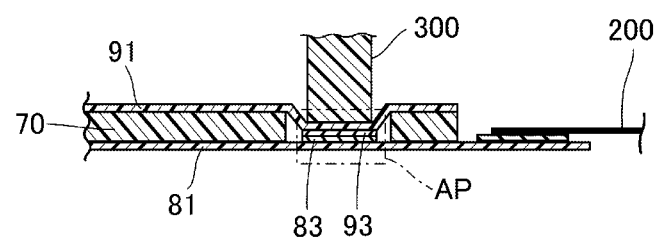
FIG. 8 is a diagram illustrating a cross-section of a load detection sensor of another embodiment.

Further, in the above-described second embodiment, the first contact point 83 and the second contact point 93 are coated with the coating member 120. However, as illustrated in FIG. 8, a pressing member 300 that presses the second contact point 93 against the first contact point 83 through the second electrode sheet 60 from a surface opposite to a surface facing the first electrode sheet 50 in the second electrode sheet 60 may be provided instead of the coating member 120. Further, a pressing member that presses the first contact point 83 against the second contact point 93 through the first electrode sheet 50 from a surface opposite to a surface facing the second electrode sheet 60 in the first electrode sheet 50 may be provided. Furthermore, a pressing member that presses both the first electrode sheet 50 and the second electrode sheet 60 may be provided. That is, a pressing member that presses at least one of the first electrode sheet 50 and the second electrode sheet 60 so that the first contact point 83 and the second contact point 93 contact each other may be provided. When such a pressing member is provided, the second contact point 93 may not be formed as the leaf spring. Additionally, a connection portion between one end of the lead wire 200 and the terminals 5A and 5B is fixed by, for example, soldering or the like. Further, the pressing member 300 or the coating member 120 may be provided to the first embodiment.

Further, the resistor 54 is provided as the chip resistor in the above-described first embodiment and the resistor 84 is provided as the printed resistor in the above-described second embodiment, but the resistors 54 and 84 may be omitted. Further, the resistors 54 and 84 may be provided at a plurality of positions.

Further, in the above-described first embodiment, the switch pressing portion 43 is disposed at the switch SW of the load detection sensor 5 to be separated from the second electrode sheet 60 of the load detection sensor 5 with a gap interposed therebetween. Further, in the above-described second embodiment, the switch pressing portion is disposed above each of the switches SW1 to SW4 of the load detection sensor 5 to be separated from the second electrode sheet 60 of the load detection sensor 5 with a gap interposed therebetween. However, the switch pressing portion may be disposed above each of the switches SW and SW1 to SW4 while contacting the second electrode sheet 60 of the load detection sensor 5. That is, the switch pressing portions disposed on the switches SW and SW1 to SW4 may be used.

Further, in the above-described first embodiment, a recess for accommodating the resistor 54 is not provided in the bottom wall of the switch accommodation portion 32, but the recess may be provided in the bottom wall of the switch accommodation portion 32.

Further, in the above-described embodiments, the pedestal 2, the housing 3, and the housing cover 4 are provided. However, a part or the entirety of the pedestal 2, the housing 3, and the housing cover 4 may be omitted, for example, when the load detection sensor is disposed at a seat pan of the vehicle seat. Further, in the load detection sensor of the embodiment, those members may be used for a purpose other than the sensor detecting the seating in the vehicle seat. Additionally, it is desirable that the first contact point 83 and the second contact point 93 be covered by the coating member 120 in a contact state when the housing 3 and the housing cover 4 are omitted in the above-described second embodiment. Further, the switch pressing portion 43 or the pressing member 300 is provided in, for example, the lower surface of the vehicle seat when the housing cover 4 is omitted.

Additionally, the components of the load detection sensor unit 1 can be appropriately combined, omitted, and modified, or known techniques may be added without departing from the object of the invention other than the content described in the first embodiment, the second embodiment, and other embodiments.

There is a possibility that the invention is used at a position of detecting a load. For example, there is a possibility that the invention is used for a seat of a vehicle such as an automobile or a nursing bed. Further, there is a possibility that the invention is particularly used for a seat on which a seat belt needs to be worn.

REFERENCE SIGNS LIST

1 . . . load detection sensor unit
2 . . . pedestal
3 . . . housing
4 . . . housing cover
5 . . . load detection sensor
50 . . . first electrode sheet
51 . . . substrate
52, 82A to 82D . . . first electrode
53, 83 . . . first contact point
54, 84 . . . resistor
55 . . . sheet penetration hole
60 . . . second electrode sheet
61 . . . metal sheet
62, 92A to 92D . . . second electrode
63, 93 . . . second contact point
70 . . . spacer
71, 72, 101A to 101E . . . opening
81 . . . first insulation sheet
85 . . . exhaust penetration hole
91 . . . second insulation sheet
102A to 102D . . . communication slit
103 . . . exhaust slit
120 . . . coating member
200 . . . lead wire
300 . . . pressing member

The invention claimed is:

1. A load detection sensor comprising:
a first electrode sheet which includes at least one first electrode and a first contact point;
a second electrode sheet which includes a second electrode facing the first electrode and a second contact point facing the first contact point and electrically connected to the second electrode;
a spacer which is disposed between the first electrode sheet and the second electrode sheet and includes at least an opening formed between the first electrode and the second electrode and between the first contact point and the second contact point;
a first terminal which is electrically connected to the first electrode; and
a second terminal which is electrically connected to the first contact point,
wherein a switch is formed by the first electrode and the second electrode and a connection maintaining portion in which an electrical connection is maintained even when an external pressure is not applied thereto is formed by the first contact point and the second contact point, and
wherein odd series of the switches electrically connected in series between the first terminal and the second terminal are set.

2. The load detection sensor according to claim 1,
wherein a portion including the second contact point in the second electrode sheet is formed as a leaf spring pressing the second contact point against the first contact point.

3. The load detection sensor according to claim 1,
wherein the second electrode sheet is formed as a metal sheet.

4. The load detection sensor according to claim 1, further comprising:
a pressing member that presses at least one of the first electrode sheet and the second electrode sheet to maintain a contact state between the first contact point and the second contact point.

5. The load detection sensor according to claim 1, further comprising:
a coating member that covers at least the first contact point of the first electrode sheet and the second contact point of the second electrode sheet to fix a contact state between the first contact point and the second contact point.

6. The load detection sensor according to claim 1,
wherein the first electrode sheet includes a first sheet penetration hole which is formed from a first surface facing the second electrode sheet to a second surface opposite to the first surface to penetrate the surfaces, and
wherein the first electrode is electrically connected to a circuit portion disposed on the second surface through a first conductive member provided inside the first sheet penetration hole.

7. The load detection sensor according to claim 6,
wherein an opening at a first surface side of the first sheet penetration hole is located in an area where the first electrode is disposed in the first surface, and
wherein the first sheet penetration hole includes an air hole which communicates with an opening between the first electrode and the second electrode through an electrode penetration hole provided in the first electrode.

8. The load detection sensor according to claim 6,
wherein the first electrode sheet includes a second sheet penetration hole which is provided at a position different from the first sheet penetration hole and is formed from the first surface facing the second electrode sheet to the second surface to penetrate the surfaces, and
wherein the first contact point is electrically connected to a circuit portion disposed on the second surface through a second conductive member provided inside the second sheet penetration hole.

9. The load detection sensor according to claim 8, comprising:
a resistor which is disposed on the second surface and electrically connects the first electrode and the first contact point to each other.

10. The load detection sensor according to claim 1, comprising:
a printed resistor which is disposed on one surface and electrically connects the first electrode and the first contact point to each other.

11. A load detection sensor unit comprising:
the load detection sensor according to claim 1; and
a switch pressing portion which is disposed on the switch and presses the switch when an external pressure is applied thereto.

12. The load detection sensor unit according to claim 11,
wherein the load detection sensor unit includes a housing which includes an accommodation space for accommodating the load detection sensor and a housing cover which covers the accommodation space, and wherein the switch pressing portion is provided in the housing cover.

* * * * *